(12) United States Patent
Yang et al.

(10) Patent No.: US 10,585,787 B2
(45) Date of Patent: Mar. 10, 2020

(54) CONSTRUCTION METHOD OF SOFTWARE ACCELERATED TESTING TECHNOLOGY BASED ON NOISE RESONANCE

(71) Applicant: BEIHANG UNIVERSITY, Beijing (CN)

(72) Inventors: Shunkun Yang, Beijing (CN); Xiaodong Gou, Beijing (CN); Zheng Zheng, Beijing (CN); Tingting Huang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/198,612

(22) Filed: Nov. 21, 2018

(65) Prior Publication Data
US 2019/0087314 A1    Mar. 21, 2019

(30) Foreign Application Priority Data
Mar. 7, 2018    (CN) .......................... 2018 1 0186487

(51) Int. Cl.
*G06F 9/44*      (2018.01)
*G06F 9/445*     (2018.01)
*G06F 11/36*     (2006.01)

(52) U.S. Cl.
CPC ...... *G06F 11/3684* (2013.01); *G06F 11/3676* (2013.01)

(58) Field of Classification Search
CPC ............. G06F 11/3684; G06F 11/3676; G06F 11/3668; G06F 11/3672; G06F 11/3688; G06F 11/3692
See application file for complete search history.

(56) References Cited

U.S. PATENT DOCUMENTS

| 2007/0018653 A1* | 1/2007 | Choi ....................... G06F 11/26 324/500 |
| 2008/0088336 A1* | 4/2008 | Pommerenke ....... G01R 31/002 324/754.21 |

(Continued)

OTHER PUBLICATIONS

Larry Venetsky, A System to Automatically Generate Test Program Sets, 2017, pp. 1-9. https://ieeexplore.org/stamp/stamp.jsp?tp=&arnumber=8080476 (Year: 2017).*

(Continued)

*Primary Examiner* — Mongbao Nguyen

(57) ABSTRACT

A construction method of a software accelerated testing technology based on a noise resonance includes steps of: (1), collecting a source code of software to be tested; (2), automatically generating software test cases based on an intelligent evolving method, until information same or similar as a fault phenomenon is searched; (3), starting a saturation noise mode, and meanwhile exerting all controllable noise sources at a maximum intensity; (4), exerting all the controllable noise sources at a minimum intensity; (5), starting a strategy noise interference mode, and generating a noise resonance; (6), continuously exerting noises at a noise intensity able to generate the noise resonance; and (7), generating effective test sequences. Through the above steps, construction of the software accelerated testing technology based on the noise resonance is completed, which helps software testers accelerate recurrence of a software fault during testing and update the software to increase a reliability thereof.

6 Claims, 2 Drawing Sheets

(56) References Cited

U.S. PATENT DOCUMENTS

| | | | | |
|---|---|---|---|---|
| 2009/0313191 | A1* | 12/2009 | Yao | G06F 17/5045 |
| | | | | 706/13 |
| 2015/0261657 | A1* | 9/2015 | Kommineni | G06F 11/3676 |
| | | | | 714/38.1 |
| 2016/0259943 | A1* | 9/2016 | Murthy | G06F 21/577 |
| 2018/0067086 | A1* | 3/2018 | Tian | G01N 29/42 |
| 2018/0365139 | A1* | 12/2018 | Rajpal | G06F 21/577 |

OTHER PUBLICATIONS

Yang shunkun, Genetic Algorithm Based on Software Diagnosis Testing, 2011, pp. 83-86. https://ieeexplore.ieee.org/stamp/stamp.jsp?tp=&arnumber=6113361 (Year: 2011).*

Luo Yin, Research on a Software Fault Injection Model Based on Program Mutation, 2015, pp. 419-422. https://ieeexplore.ieee.org/stamp/stamp.jsp?tp=&arnumber=7120638 (Year: 2015).*

W. Eric Wong, Effective Software Fault Localization Using an RBF Neural Network, 2012, pp. 1-21. https://personal.utdallas.edu/~ewong/SE6367/01-Project/08-SFL-papers/03-RBF.pdf (Year: 2012).*

Qinghe Pan, Research on Key Technologies of Software Implemented Fault Injection, Chinese Doctoral Dissertations Full-text Database, Jul. 2011.

* cited by examiner

CONSTRUCTION METHOD OF SOFTWARE ACCELERATED TESTING TECHNOLOGY BASED ON NOISE RESONANCE

CROSS REFERENCE OF RELATED APPLICATION

The application claims priority under 35 U.S.C. 119(a-d) to CN 201810186487.5, filed Mar. 7, 2018.

BACKGROUND OF THE PRESENT INVENTION

Field of Invention

The present invention provides a construction method of a software accelerated testing technology based on a noise resonance, which relates to realization of the software accelerated testing technology based on the noise resonance and belongs to fields of software credibility and software testing.

Description of Related Arts

With the rapid development of the computer technology, the function of the software becomes more and more powerful, meanwhile the scale and complexity of the software increase sharply. In order to decrease the loss caused by the software fault, software testing is made before the official launch of the software. Therefore, it is very important to find the software fault and remove the fault, so as to ensure the quality and reliability of the software. At the same time, because of the sharply increased software scale and the high testing cost due to the time-consuming laborsome conventional software testing method, the requirement of realizing the testing automation becomes increasingly urgent. One of the automatic testing methods, which is relatively mature and popular at present, is the automatic test case generation method based on the evolving method.

The general thinking of the current widely applied evolving method is to adopt the test case set as a population and adopt the coverage rate of the test case as the coverage rate function, so as to realize optimization of the test cases through the respective evolving mechanism. Meanwhile, many other optimization methods are provided, for solving the problem that the evolving method is unavoidable and easy to fall into the local optimum and for continuously increasing the testing benefits. It is showed by practices that the automatic test case generation method based on the evolving method can achieve the higher testing coverage rate while reducing the software testing cost.

The random resonance theory can be described as that: the input noise intensity is increased, and meanwhile the input signal intensity of the non-linear system is kept constant; when the noise intensity is at a specified level, the output signal-to-noise ratio of the system will increase at the output terminal of the non-linear system, and a single-peak (or multi-peak) resonance curve known by people in mechanics is generated. In recent years, with the adiabatic approximation, linear response port and intrinsic perturbation expansion as the main theories, the researches on the random resonance have made huge progress and gained wide applications in engineering field.

The software testing based on the evolving method generally excessively pursues the improvement of the software space coverage and emphasizes the characteristics, such as mutation and crossover, which highlight the diversity and jump out of the method local convergence. Thus, during the searching process, even if the information same or similar as the software fault phenomenon is temporarily searched, the test sequence uncorrelated to or far from the fault phenomenon is highly possible to be generated during the testing process of the next iterative evolution, which causes the too small sample size of the effective faults in the local space. Thus, when the local optimum or approximate solution occurs, the mutation operation which works normally should be paused, and a new strategy is nested, so as to fully utilize the local rare event which is beneficial and seldom appears (especially when the event is close to the fault phenomenon) for generating more test sequences close to the fault phenomenon and increasing the recurrence probability of the software fault. For the above situation, the inventors provide a construction method of a software accelerated testing technology based on a noise resonance. In the technology, the random resonance theory is used for reference that: the software to be tested is seen as a dynamic non-linear chaotic information system; various types of noises are exerted at the input spatial terminal of the program; the internal noise generated by the related coupling and interferences in the program space is utilized for coupling and transmission of the noise, so as to amplify the noise in the program space and the output space, trigger the noise resonance at the output terminal as far as possible, generate more test cases related to the fault, and realize the rapid recurrence of the software fault phenomenon or increase the recurrence probability. With the above technology, the noise is fully utilized, and the accelerated testing of the software is realized based on the noise resonance theory.

The software testing technology is constructed based on the noise resonance theory, and the software accelerated testing technology based on the noise resonance is formed, so that the credibility, safety and usability of the software are increased while the software testing efficiency is increased.

SUMMARY OF THE PRESENT INVENTION

Objects of Present Invention

Conventional automatic test case generation technologies in software testing field are generally based on the intelligent evolving method that: the test case set is adopted as the population, the coverage rate of the test case is adopted as the coverage rate function, and optimization of the test cases is realized through the respective evolving mechanism. Meanwhile, improvement of the evolving method with various theoretical methods is unavoidable to fall into the local optimum, which gains the good effect. The test case generation based on the evolving method excessively pursues the improvement of the software space coverage and emphasizes the mutation and crossover for highlighting the diversity and jumping out of the method local convergence. Thus, during the searching process, even if the information same or similar as the software fault phenomenon is temporarily searched, the test sequence uncorrelated to or far from the fault phenomenon is highly possible to be generated in the future evolution process, which causes the too small sample size of the effective faults. Therefore, combined with the random resonance theory, the present invention provides a construction method of a software accelerated testing technology based on a noise resonance. The random resonance theory describes a phenomenon that existence of the internal noise or external noise in the non-linear system can increase the response outputted by the system, which has been widely applied in fields of chemistry, biology, physics, mathematics and signal processing. The core idea of the present invention is to utilize the noise resonance theory; during the test case generation process with the evolving method, when the information same or similar as the fault phenomenon is searched, evolution is paused, and a noise perturbation is appropriately added; through adjustment and control of the noises, the noises are coupled, interfered, transmitted, amplified and vibrated among the input space, internal space and output space of the program and the fault phenomenon space, so that a local noise resonance phenomenon is formed and the recurrence of the random fault phenomenon is accelerated. In the above technology, the saturation noise mode is firstly started, namely all controllable noise sources at a maximum intensity are exerted; then, all the controllable noise sources at a minimum intensity are exerted; if the noise resonance cannot he generated at above two intensities, a strategy (time constraint or step constraint) random noise interference mode is started. During the interference process, unless the program crashes or breaks down, the interference is kept exerting in the continuous operations of the program in principle, so as to reflect the temporal and spatial accumulative effect. The above technology is able to accelerate the recurrence of the software fault or increase the recurrence probability, so as to realize accelerated testing of the software.

It can be seen that: the construction of the above technology integrates the conventional test case generation technology based on the evolving method and the noise resonance theory and makes an innovation, thereby forming a software accelerated testing technology based on the noise resonance.

Technical Solutions

A construction method of a software accelerated testing technology based on a noise resonance is provided. In following description of the construction method, NRSAT is cited to represent the software accelerated testing technology based on the noise resonance.

A construction method of a software accelerated testing technology based on a noise resonance comprises steps of:

(1), collecting a source code of software to be tested;

(2), automatically generating software test cases based on an intelligent evolving method, until information same or similar as a fault phenomenon is searched;

(3), starting a saturation noise mode, and meanwhile exerting all controllable noise sources at a maximum intensity;

(4), exerting all the controllable noise sources at a minimum intensity;

(5), starting a strategy noise interference mode, and generating a noise resonance;

(6), continuously exerting noises at a noise intensity able to generate the noise resonance; and (7), generating effective test sequences.

Preferably, in the step (1), the step of "collecting a source code of software to be tested" particularly comprises a step of acquiring a source program file of the software required to be tested.

Preferably, conventional automatic test case generation methods based on the evolving method adopt a test case set as a population, so that a single test case is namely an individual in the population, and adopt a coverage rate of the test case as a fitness function; therefore, the step of "automatically generating software test cases based on an intelligent evolving method" in the step (2) particularly comprises steps of:

(2.1), initializing a population, and generating an initial population through random generation;

(2.2), calculating a fitness function of the population;

(2.3), judging whether meeting an evolution termination requirement;

(2.4), if meeting, executing step (2.6);

(2.5), if not meeting, making operations such as mutation, crossover and selection; evolving the population into a second population, and calculating a fitness function thereof; and then going back to step (2.3); and (2.6), terminating, and outputting the current population;

wherein: because evolution of the population changes based on a male parent, after evolving for certain generations, a difference among individuals is decreased, leading to falling into a local optimum; thus, in order to increase population diversity, crossover and mutation are emphasized at various conditions for jumping out of the local optimum, causing that even if the information same or similar as the fault phenomenon is temporarily searched during searching, the test sequence uncorrelated to or far from the fault phenomenon is highly possible to be generated during a testing process of a next iterative evolution, and further causing a too small sample size of effective faults in a local space;

"until information same or similar as a fault phenomenon is searched" recited in the step (2) means that: during an evolution process of the population, one or some generated test cases are able to stimulate a software fault; especially for fault recurrence of some random faults which are difficult to recur, the test case able to trigger the fault same or similar as the fault phenomenon intended to be reproduced is rare and significant; therefore, more test cases similar to the above test case should be generated, so as to trigger the software fault as much as possible and accelerate recurrence of the fault.

Preferably, the step of "starting a saturation noise mode, and meanwhile exerting all controllable noise sources at a maximum intensity" in the step (3) means that: the noise resonance is triggered only when the intensity of the noises is at a resonance point, which requires that the noises must be manually controllable noises; that is to say, the intensity and duration time of the noises can be adjusted at any moment according to requirements; in order to trigger the noise resonance, the noises are firstly exerted in the saturation noise mode; the saturation noise mode means that all of the exerted controllable noises are at a maximum intensity Intensity$_{max}$, so as to observe influences brought by the noises.

Preferably, the step of "exerting all the controllable noise sources at a minimum intensity" in the step (4) means that: the saturation noise mode generally is unable to trigger the noise resonance; after exerting the saturation noises, all the controllable noises at a minimum intensity Intensity$_{min}$ are exerted to a software system.

Preferably, the step of "starting a strategy noise interference mode, and generating a noise resonance" in the step (5) means that: exerting all the controllable noises at the minimum intensity to the software system still cannot guarantee that the noise resonance will be triggered at the above noise intensity; thus, one strategy is required to find out a noise intensity of a resonance point able to trigger the noise resonance; the strategy noise interference mode comprises two strategies of time constraint and step constraint; the two strategies can be used independently or used together;

the time constraint strategy means to gradually change a continuous exerting time of all the controllable noises, and unit thereof can be seconds; according to a sensitivity of the system to the noises, a time increment $\Delta t$ is selected; a continuous time of the noises is increased by Δt for each time, until the continuous exerting time able to trigger the noise resonance is found out;

the step constraint strategy means to gradually change the intensity of all the controllable noises; when the exerted noise interference on the system is at the minimum intensity $Intensity_{min}$, according to the sensitivity of the software system to the noises, an intensity increment ΔIntensity is selected; the intensity increment is determined according to a following formula of:

$$\Delta Intensity = \frac{Intensity_{max} - Intensity_{min}}{n};$$

in the formula, n is determined according to the sensitivity of the software system to the noises; the system is more sensitive, n is larger; conversely, n is smaller;

the strategy noise interference mode aims to trigger the noise resonance; the two strategies of time constraint and step constraint can be flexibly used according to an actual condition.

Preferably, the step of "continuously exerting noises at a noise intensity able to generate the noise resonance" in the step (6) particularly comprises a step of: after obtaining the noise intensity $Intensity_{resonance}$ able to trigger the noise resonance through the strategy noise interference mode, unless the program crashes or breaks down, keeping exerting the noise interference in continuous operations of the program in principle, so as to reflect a temporal and spatial accumulative effect.

Preferably, the step of "generating effective test sequences" in the step (7) particularly comprises a step of: when the software system is at a noise resonance condition, generating more test sequences close to the fault phenomenon, so as to increase a recurrence probability of the software fault.

Through the above steps, construction of the software accelerated testing technology based on the noise resonance is completed. When the information same or similar as the fault phenomenon is searched, evolution is paused, and the noise perturbation is appropriately added. Through adjustment and control of the noises, the noises are coupled, interfered, transmitted, amplified and vibrated among the input space, internal space and output space of the program and the fault phenomenon space, so that the local noise resonance phenomenon is formed and the recurrence of the software fault phenomenon is accelerated. The present invention is suitable for solving the recurrence problem of the software fault in the practical software testing, and helps the software testers accelerate the recurrence of the software fault and find out the fault cause, thereby updating the software to increase the reliability thereof, which has the relatively high practical application value.

Advantages

Compared with the prior art, the present invention has following advantages. During generation of the test cases, the conventional evolving testing technology excessively pursues the improvement of the software space coverage and emphasizes the mutation and crossover for highlighting the diversity and jumping out of the method local convergence. Thus, even if the information same or similar as the software fault phenomenon is temporarily searched, the test sequence uncorrelated to or far from the fault phenomenon is highly possible to be generated in the subsequent evolution process, which causes the too small sample size of the effective faults. Therefore, the present invention uses the random resonance theory for reference and adds the noises in the evolving testing of the software, so as to trigger the noise resonance, generate more test cases related to the fault phenomenon, and accelerate the fault recurrence. The present invention integrates the conventional random resonance theory and software evolving testing method and makes an innovation, thereby providing the software accelerated testing technology based on the noise resonance.

Figure 1:
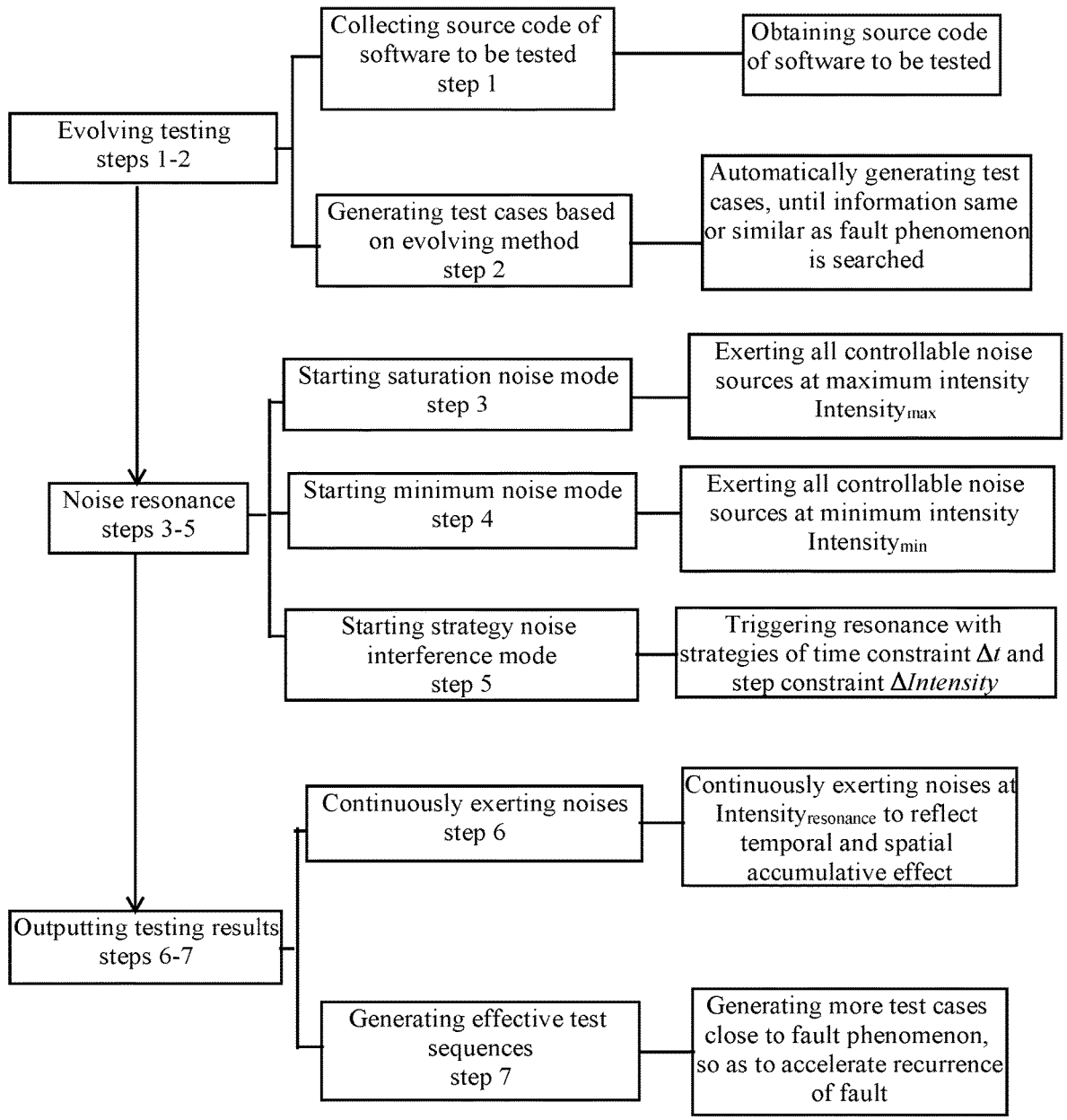
FIG. 1 is a flow chart of a construction method of a software accelerated testing technology based on a noise resonance according to a preferred embodiment of the present invention.

In figures: steps 1-7 in FIG. 1 correspond to steps described in technical solutions; $Intensity_{max}$, $Intensity_{min}$ and $Intensity_{resonance}$ in FIG. 1 are correspondingly a maximum controllable noise intensity, a minimum controllable noise intensity and a noise intensity able to trigger a noise resonance; Δt and ΔIntensity in FIG. 1 are correspondingly a time increment in a time constraint strategy and an intensity increment in a step constraint strategy.

DETAILED DESCRIPTION OF THE PREFERRED EMBODIMENT

To make solved technical problems, technical solutions and advantages of the present invention clearer, the preferred embodiment is described with accompanying drawings in detail as follows.

According to the preferred embodiment of the present invention, a construction method of a software accelerated testing technology based on a noise resonance is provided. With the technology constructed by the above method, rapid recurrence of a software fault is accelerated in software testing. In the technology, test cases are firstly generated with a testing method based on an intelligent evolving method; when information same or similar as a fault phenomenon is searched, evolution is paused, and a noise perturbation is appropriately added. A saturation noise mode is firstly started, namely all controllable noise sources at a maximum intensity are exerted; then, all the controllable noise sources at a minimum intensity are exerted; and finally a strategy (time constraint or step constraint) random noise interference mode is started. During an exerting process of the noises, unless the program crashes or breaks down, the interference is continuously exerted, so as to reflect a temporal and spatial accumulative effect. The above technology is able to accelerate the recurrence of the software fault or increase the recurrence probability, so as to realize accelerated testing of the software.

Figure 2:
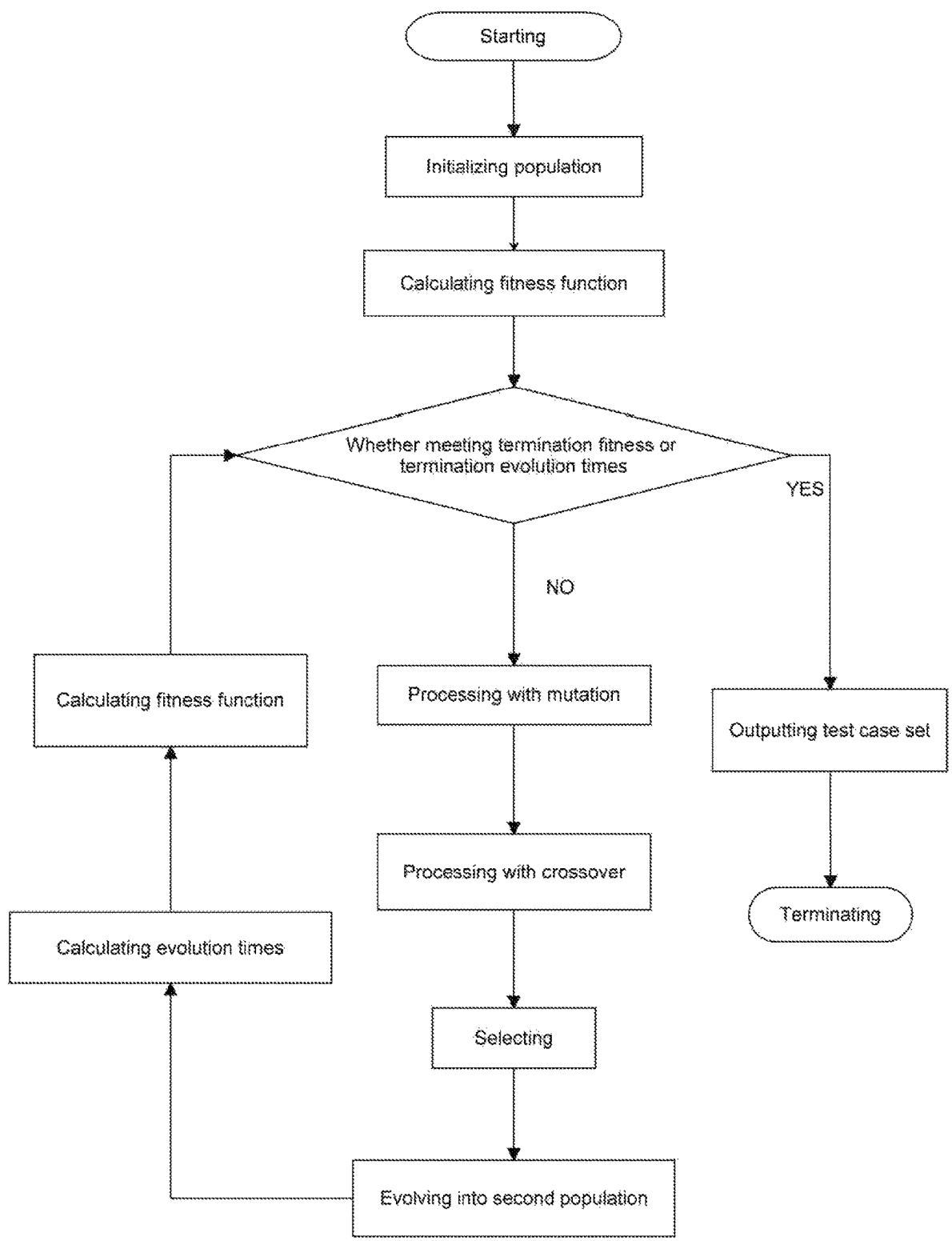
FIG. 2 is a flow chart of an automatic test case generation method based on an evolving method according to the preferred embodiment of the present invention.

Referring to FIG. 1, a construction method of a software accelerated testing technology based on a noise resonance comprises steps of:

(1), collecting a source code of software to be tested, particularly comprising a step of acquiring a source program file of the software required to be tested;

(2), automatically generating software test cases based on an intelligent evolving method; wherein:

a test case set is adopted as a population, a single test case is adopted as an individual of the population, and a coverage rate of the test case is adopted as a fitness function; the automatic test case generation method based on the evolving method comprises steps of:

| method | automatic test case generation method based on intelligent evolving method |
|---|---|
| input | source code of software to be tested |
| output | test case set |
| 1 | initializing a population, and generating an initial population through random generation; |
| 2 | calculating a fitness function of the population; |
| 3 | judging whether meeting a termination requirement, namely whether reaching set maximum evolution times required by the fitness function; if meeting, executing step 10; if not meeting, executing step 4; |
| 4 | processing with population mutation; |
| 5 | processing with population crossover; |
| 6 | selecting individuals; |
| 7 | calculating evolution times; |
| 8 | calculating a fitness function of a current population; |
| 9 | going back to step 3; |
| 10 | terminating, and outputting a test set case; | a flow chart of the above method is shown in FIG. 2;

compared with conventional manual test case generation methods for software testing, the automatic test case generation method based on the evolving method has great improvements in efficiency and effect; however, because the above method is based on the evolving method and evolution of the population changes based on a male parent, after evolving for certain generations, a difference among the individuals is decreased, so that it is unable to further search more information, leading to falling into a local optimum; thus, in order to increase population diversity, crossover and mutation are emphasized in multiple practical engineering applications for jumping out of the local optimum, causing that even if the information same or similar as the fault phenomenon is temporarily searched during a searching process, a test sequence uncorrelated to or far from the fault phenomenon is highly possible to be generated during a testing process of a next iterative evolution; that is to say, although many test cases are generated, many test cases are unable to trigger the software fault, causing a too small sample size of effective faults in a local space; in software testing, for fault recurrence of some random faults which are difficult to recur, the effective test case able to trigger the fault same or similar as the fault phenomenon intended to be reproduced is rare and significant; therefore, more test cases similar to the above test case should be generated, so as to trigger the software fault as much as possible and accelerate recurrence of the fault;

(3), starting a saturation noise mode, and exerting noises; wherein: the noise resonance is triggered only when the intensity of the noises is at a resonance point, which requires that the noises must be manually controllable noises; that is to say, the intensity and duration time of the noises can be adjusted at any moment according to requirements; in order to trigger the noise resonance, the noises are firstly exerted in the saturation noise mode; the saturation noise mode means that all of the exerted controllable noises are at a maximum intensity $Intensity_{max}$; when the noises are at the maximum intensity, influences brought by the noises can be more intuitively observed, so as to determine an adjustment range in the subsequent noise adjustment operation;

(4), exerting noises at a minimum intensity; wherein: the saturation noise mode generally is unable to trigger the noise resonance; after exerting the saturation noises, all the controllable noises at a minimum intensity $Intensity_{min}$ are exerted to the software system, so as to subsequently adjust the noises based on the minimum noise intensity for triggering the noise resonance;

(5), starting a strategy noise interference mode, and generating a noise resonance; wherein: exerting all the controllable noises at the minimum intensity to the software system still cannot guarantee that the noise resonance will be triggered at the above noise intensity; thus, one strategy is required to find out a noise intensity of a resonance point able to trigger the noise resonance; the strategy noise interference mode comprises two strategies of time constraint and step constraint; the two strategies can be used independently or used together;

the time constraint strategy means to gradually change a continuous exerting time of all the controllable noises, and unit thereof can be seconds; according to a sensitivity of the system to the noises, a time increment $\Delta t$ is selected; a continuous time of the noises is increased by $\Delta t$ for each time, until the continuous exerting time able to trigger the noise resonance is found out;

the step constraint strategy means to gradually change the intensity of all the controllable noises; when the exerted noise interference on the system is at the minimum intensity $Intensity_{min}$, according to the sensitivity of the software system to the noises, an intensity increment $\Delta Intensity$ is selected; the intensity increment is determined according to a following formula of:

$$\Delta Intensity = \frac{Intensity_{max} - Intensity_{min}}{n};$$

in the formula, n is determined according to the sensitivity of the software system to the noises; the system is more sensitive, n is larger; conversely, n is smaller;

the strategy noise interference mode aims to trigger the noise resonance; the two strategies of time constraint and step constraint can be flexibly used according to an actual condition;

(6), continuously exerting the noises able to generate the noise resonance, particularly comprising a step of: after obtaining the noise intensity $Intensity_{resonance}$ able to trigger the noise resonance through the strategy noise interference mode, unless the program crashes or breaks down, keeping exerting the noise interference in continuous operations of the program in principle, so as to reflect a temporal and spatial accumulative effect of the noise resonance; and (7), generating effective test sequences, particularly comprising a step of: when the software system is at a noise resonance condition, generating more test sequences close to the fault phenomenon, so as to increase a recurrence probability of the software fault.

Through the above steps, construction of the software accelerated testing technology based on the noise resonance is completed. In the technology, the test cases are firstly generated with the testing method based on the intelligent evolving method; when the information same or similar as the fault phenomenon is searched, evolution of the population is paused, and the noise perturbation is appropriately added. The saturation noise mode is firstly started, namely all the controllable noise sources at the maximum intensity are exerted; then, all the controllable noise sources at the minimum intensity are exerted; and finally the strategy (time constraint or step constraint) noise interference mode is started. During the exerting process of the noises, unless the program crashes or breaks down, the interference is continuously exerted, so as to reflect a temporal and spatial accumulative effect. The above technology is able to accelerate the recurrence of the software fault or increase the recurrence probability, so as to realize accelerated testing of the software.

The fault prediction technology is constructed based on the random resonance theory, and a relatively practical software accelerated testing technology based on the noise resonance is formed.

The part which is not described in detail of the present invention belongs to the common knowledge in art.

The above-described is merely the preferred embodiment of the present invention, and the protection scope of the present invention is not limited thereto. Therefore, modifications and replacements which can be easily obtained by one skilled in the art based on the disclosed technical solutions of the present invention are all encompassed in the protection scope of the present invention.

What is claimed is:

1. A construction method of a software accelerated testing technology based on a noise resonance, comprising steps of:
    collecting a source code of software to be tested;
    automatically generating software test cases based on an intelligent evolving method, until information same or similar as a fault phenomenon is searched;
    starting a saturation noise mode, and meanwhile exerting all controllable noise sources at a maximum intensity;
    exerting all the controllable noise sources at a minimum intensity;
    starting a strategy noise interference mode, and generating a noise resonance;
    continuously exerting noises at a noise intensity able to generate the noise resonance; and
    generating effective test sequences;
    wherein: through the above steps, construction of the software accelerated testing technology based on the noise resonance is completed; when the information same or similar as the fault phenomenon is searched by an evolving testing method, evolution is paused, and a noise perturbation is appropriately added; through adjustment and control of the noises, the noises are coupled, interfered, transmitted, amplified and vibrated among an input space, an internal space and an output space of a program and a fault phenomenon space that a local noise resonance phenomenon is formed and recurrence of the software fault phenomenon is accelerated;
wherein automatically generating software test cases based on an intelligent evolving method particularly comprises steps of:
    initializing a population, and generating an initial population through random generation;
    calculating a fitness function of the population;
    judging whether the fitness function meeting an evolution termination requirement;
    if meeting, terminating and outputting the current population;
    if not meeting, processing a mutation, crossover or selection operation; evolving the population into a second population, and calculating a fitness function thereof; and then going back to step judging whether meeting the evolution termination requirement; and
wherein automatically generating software test cases based on an intelligent evolving method, until information same or similar as a fault phenomenon is searched during an evolution process of the population, one or more generated test cases are able to stimulate a software fault;
    wherein starting a strategy noise interference mode, and generating a noise resonance comprising:
    exerting all the controllable noises at the minimum intensity to a software system still cannot guarantee that the noise resonance will be triggered at the noise intensity; as a result one strategy is required to find out a noise intensity of a resonance point able to trigger the noise resonance; the strategy noise interference mode comprises two strategies: time constraint and step constraint, the two strategies can be used independently or used together;
    the time constraint strategy gradually change a continuous exerting time of all the controllable noises in seconds; according to a sensitivity of the system to the noises, a time increment .DELTA. t($\Delta$t) is selected; a continuous time of the noises is increased by $\Delta$t for each time, until the continuous exerting time able to trigger the noise resonance is found out;
    constraint strategy gradually change the intensity of all the controllable noises; when an exerted noise interference on the system is at the minimum intensity Intensity min, according to the sensitivity of the software system to the noises, an intensity increment .DELTA. Intensity ($\Delta$Intensity) is selected; the intensity increment is determined according to a following formula of:

$$\Delta Intensity = \frac{Intensity_{max} - Intensity_{min}}{n};$$

in the formula, n is determined according to the sensitivity of the software system to the noises; the system is more sensitive, n is larger; conversely, n is smaller;
    the strategy noise interference mode aims to trigger the noise resonance; the two strategies of time constraint and step constraint can be flexibly used according to an actual condition.

2. The construction method of the software accelerated testing technology based on the noise resonance, as recited in claim 1, wherein collecting a source code of software to be tested particularly comprises:
    acquiring a source program file of the software required to be tested.

3. The construction method of the software accelerated testing technology based on the noise resonance, as recited in claim 1, wherein:
    starting a saturation noise mode, and meanwhile exerting all controllable noise sources at a maximum intensity means that: the noise resonance is triggered only when the intensity of the noises is at a resonance point which requires that the noises must be manually controllable noises the intensity and duration time of the noises can be adjusted at any moment according to requirements; in order to trigger the noise resonance, the noises are firstly exerted in the saturation noise mode; the saturation noise mode means that all of the exerted controllable noises are at a maximum intensity Intensity$_{max}$ to observe influences brought by the noises.

4. The construction method of the software accelerated testing technology based on the noise resonance, as recited in claim 1, wherein exerting all the controllable noise sources at a minimum intensity means that: the saturation noise mode generally is unable to trigger the noise resonance; after exerting the saturation noises, all the controllable noises at a minimum intensity $Intensity_{min}$ are exerted to a software system.

5. The construction method of the software accelerated testing technology based on the noise resonance, as recited in claim 1, wherein continuously exerting noises at a noise intensity able to generate the noise resonance particularly comprises:

after obtaining the noise intensity $Intensity_{resonance}$ able to trigger the noise resonance through the strategy noise interference mode, unless the system crashes or breaks down, keeping exerting a noise interference in continuous operations of the program.

6. The construction method of the software accelerated testing technology based on the noise resonance, as recited in claim 1, wherein generating effective test sequences particularly comprises:

when the software system is at a noise resonance condition, generating more test sequences close to the fault phenomenon, to increase a recurrence probability of the software fault.

\* \* \* \* \*